Sept. 23, 1969          N. F. HECTOR            3,469,104
      DEVICE FOR DETERMINING THE STRUCTURE OF THIN, PARTLY
        TRANSPARENT MATERIALS AS TEXTILE AND PAPER
                    MATERIALS OR THE LIKE
                    Filed Jan. 14, 1966
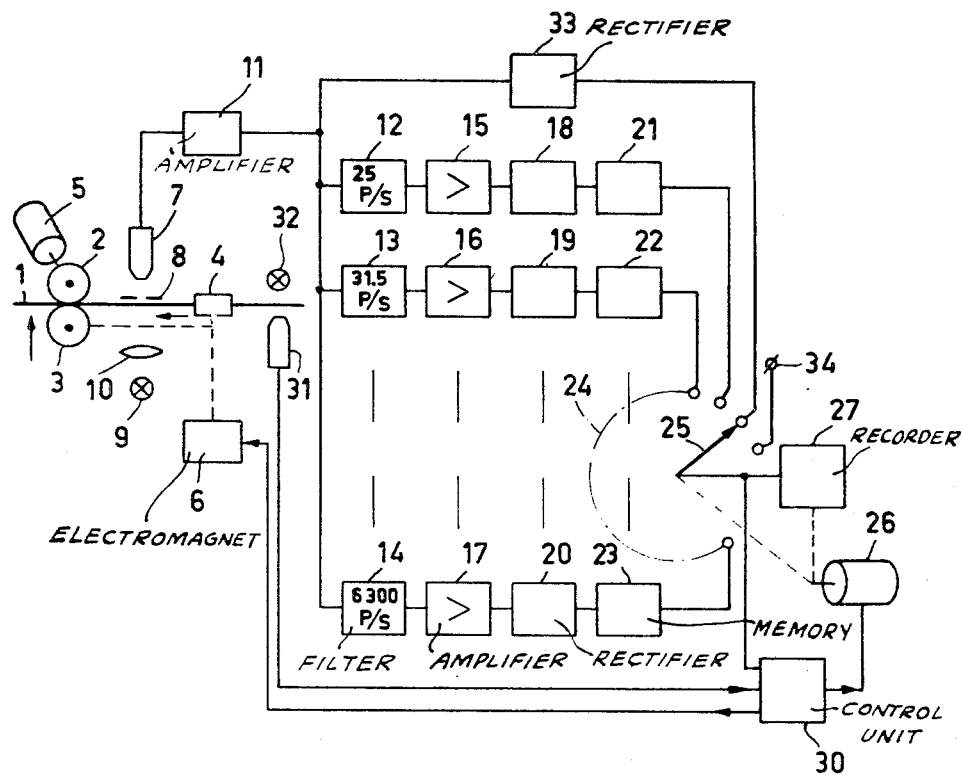
INVENTOR.
NILS F. HECTOR
BY
AGENT United States Patent Office 3,469,104
Patented Sept. 23, 1969

3,469,104
DEVICE FOR DETERMINING THE STRUCTURE OF THIN, PARTLY TRANSPARENT MATERIALS AS TEXTILE AND PAPER MATERIALS OR THE LIKE
Nils Folke Hector, Solna, Sweden, assignor, by mesne assignments, to U.S. Philips Corporation, New York, N.Y., a corporation of Delaware
Filed Jan. 14, 1966, Ser. No. 520,574
Claims priority, application Sweden, Jan. 18, 1965, 639/65; Oct. 28, 1965, 13,958/65
Int. Cl. G01n *21/30*
U.S. Cl. 250—219                        4 Claims

ABSTRACT OF THE DISCLOSURE

A device for analyzing the structure of thin, partly transparent materials includes means for scanning a light spot across the surface of the material and a photocell for sensing the light transmitted through the material. The photocell signal is applied to a plurality of parallel band pass filters tuned to adjacent frequency bands. The output of the filters is applied to individual memory devices. The memory devices are successively scanned to derive information about the frequency spectrum of the photocell signal, which in turn indicates the presence or absence of errors in the material.

---

This invention relates to a device for determining the structure of thin partly transparent materials such as textile and paper materials, or the like, by measuring the light transmission ability across the surface of the material. By comparing the measured structure with a predetermined required normal structure for the material in question, a criterion is achieved for determining whether or not the investigated material has the required properties. Presence of certain abnormal frequencies in the frequency curve produced by the measurement gives a further indication about certain typical errors in the manufacturing procedure. In this way, it is possible when investigating textile materials to discover errors therein, and by the shape of the curve produced by the measurement, it is also possible to discriminate between different types of errors, as for example, warp and weft mistakes, gaps and dust or other sorts of spots.

In the manufacture of paper, more or less pronounced accumulations of paper mass will arise due to different factors in the preparation of the paper mass. As a result the paper will show varying light transmission ability over its surface. A requirement upon a high quality paper is that the variations in the light transmission ability are maintained within certain predetermined limits. The quality of a paper is, however, not only dependent upon the magnitude of the variations but also upon the distribution of the said accumulations causing the variations across the surface of the paper. In order to achieve a check upon the manufacturing procedure, it is therefore required to determine both the magnitude of the variations and the distribution of same across the surface of the paper. Each paper quality has normally an unevenness or "flock" pattern of a certain shape and by determining the said pattern of the manufactured paper, it is possible to get a check upon the manufacturing procedure by a comparison with the shape of the normal flock pattern.

An object of the invention is to provide a simple device for rapidly determining the structure of thin, partly transparent materials by measuring the light transmission ability thereof. The device comprises means for spotwise illumination of the material and sensing by means of a photocell device the light intensity transmitted through the material at the illuminated spot under simultaneous mutual motion between the material and the illumination means and the photocell device respectively, so that the illuminated spot is displaced with constant speed across the surface of the material. The photocell device is connected through a required amplifying means to the input of a number of band-pass filters having relatively different successively displaced and substantially adjacent bandpass regions. Individual memory means are coupled to each bandpass filter for storing a magnitude representing the value of the AC current passing through the bandpass filter. Subsequently, the memory means are successively scanned and the output values therefrom are transmitted to an indicating or registering device. In this way, information is derived about the spectrum distribution of the signal derived from the photocell device and caused by variations in the light transmission ability of the material.

By means of this arrangement from a number of bandpass filters each covering its individual band in the frequency range, within which signal frequencies can appear in the signal from the photocell device during scanning of a material with a selected driving speed, full information is achieved about the structure of the sample material. The signals from the memory means may suitably be applied to a registering device such as a recorder which is driven synchronously with the scanning device. The frequency curve produced in this way can thereafter be compared with a standard curve for the material in question.

The invention now will be explained more fully in connection with the accompanying drawing which shows a block diagram of a device according to the invention.

In the drawing, reference numeral 1 designates a strip of material whose structure is to be determined. The sample strip is introduced between a couple of rollers 2 and 3 and also passes through a brake device 4. The roller 2 is connected to a driving motor 5 adapted to drive the strip with constant speed in the direction indicated by the arrow. The roller 3 is movable in direction to driving roller 2. A magnet 6 is mechanically connected to the brake device 4 and to the roller 3 so that the roller 3 is pressed against the driving roller 2 at the same time as the brake device 4 releases the strip upon excitation of the magnet. This arrangement makes possible a rapid start and stop of the strip. The driving speed amounts in the chosen example to 1 m./s.

Between the rollers and the brake device there is a photo electric measuring unit consisting of a photocell 7 and a diaphragm 8 situated on one side of the sample strip, and a light source 9 and collector lens 10 situated at the opposite side of the strip. The light source and lens system produces a sharp light spot of small diameter upon the material. The photocell 7 is arranged with its light sensitive surface opposite the light spot and is influenced by the light passing through the material at the illuminated spot. As the sample strip is driven with a certain speed past the photo-electric measuring unit, the variations in light transmission ability caused by varying density (flock pattern) in the material will produce a corresponding variation in the output signal from the photocell.

The output signal of the photocell 7 is amplified in an amplifier 11 having its output connected to a number of bandpass filters 12, 13, 14. The pass bands of the different filters are displaced relative to each other and so dimensioned that each filter covers ⅓ of an octave in the chosen frequency range. In the chosen example, the first filter 12 has a center frequency of 25 c./s., the next filter a center frequency of about 31.5 c./s. and the following filter a center frequency of about 40 c./s. The 25th and last filter has a center frequency of 6,300 c./s. The band widths of the different filters are selected so that the pass bands of the filters overlap each other somewhat in order to prevent loss of information. At a speed of the sample strip of 1 m./s., a frequency of 25 c./s. corresponds to a wave length upon the paper strip of 40 mm., and a frequency of 6,300 c./s. corresponds to a wave length of 0.159 mm. The filters may be of a construction known per se and, for example, they may be composed of capacitances and inductances. By suitable dimensioning of the components included in the filter, it has been ensured that the filters have a constant damping factor within the pass band and that the flanks at the band limits are steep.

The output voltages from the filters are amplified in amplifiers 15, 16, 17 and thereafter rectified in rectifier units 18, 19, 20. The voltage received from each rectifier is stored in an individual memory means 21, 22, 23, for example, consisting of a capacitor. The memory means have their outputs connected to the stationary contacts of a switch 24, the rotor 25 of the switch is driven by a motor 26 so that, in successive order, it is brought into contact with the different stationary contacts. The rotor 25 of the switch 24 is electrically connected to the input of an ink recorder 27. The motor 26 is also used for driving the recorder paper in recorder 27 so that the rotor of the switch and the recorder paper are driven synchronously. The input impedance of the recorder is so high that the storage capacitors in the memory means do not discharge during the scanning operation. The charging time constant of the storage capacitors is furthermore chosen so high that no charging takes place during the short start and stop periods.

A measuring operation is started and controlled from a start and control unit 30 which is connected on the one hand to the magnet 6 and driving motor 26 and on the other hand to the input of the recorder 27. The control unit is also connected to a photo-electric measuring unit consisting of a photocell 31 and a lamp 32 situated upon opposite sides of the strip 1. The purpose of photoelectric measuring unit 31, 32 is to indicate the end of a measuring operation by sensing the rear edge of the sample strip.

The switch 24 also has stationary contact connected to the output of the amplifier 11 through a rectifier 33 for sensitivity adjustment purposes, and a contact leading to a calibration input terminal 34.

Sensitivity adjustment is effected by setting the switch 24 in the adjustment position, whereafter the light from the light source 9 is pulsed in a manner not shown, and the amplification factor of the amplifier 11 is varied until a suitable deflection is achieved in recorder 27. The measurement is then initiated by actuation of a start button included in unit 30. Such actuation results in excitation of motor 26 so that the rotor of the switch is driven rapidly one revolution from the initial position shown. At the same time, the input of the recorder is short-circuited to ground in order to discharge the storage capacitors of all memory means. The control unit 30 thereafter delivers current to the magnet 6 so that the strip 1 is driven with the required speed in the direction indicated by the arrow. The current supply to magnet 6 is interrupted when the rear edge of the strip reaches the photo-electric unit 31, 32 so that the strip is stopped before its rear edge of the same reaches photocell 7. The photo-electric measuring unit 31, 32 also produces a start pulse to the motor 26, which now rotates with a lower speed for sensing successively the output voltages of the different memory means and registering the magntiude of the said voltages upon the paper strip of the recorder. The motor 26 stops automatically after reaching the initial position. As a result of the measurement, there is produced upon the recording strip a stair case shaped curve representing the frequency spectrum of the signal generated by the photocell 7. Control unit 30 can be designed as a relay device having a number of relays adapted to be excited in successive order. The signal contacts of these relays are connected to the controlled means such that the described operations are carried through automatically after actuation of a start button. Such a relay device can be constructed in a conventional manner according to known principles and need not be described in detail. For simplifying the measuring device, it is possible to let that relay which initiates excitation of the magnet 6, and consequently driving of the paper strip 1, be shaped as a time relay having a predetermined return time which is adapted to the length of the strip 1 and the driving speed such that the magnet is de-energized and the drive to the strip therefore interrupted before the rear edge of the strip reaches the photo-electric measuring unit 7–10. The measuring unit 31, 32 then will be superfluous and can be omitted.

What is claimed is:

1. A device for determining the structure of thin, partly transparent materials by measuring their light transmission comprising, means for illuminating a spot on the material, means including a photocell device for sensing the intensity of the light transmitted through the material at the illuminated spot, means providing simultaneous mutual motion between the material and the illumination means and the photocell device, respectively, so that the illuminated spot is displaced with constant speed across the surface of the material, signal amplifying means, a plurality of bandpass filters having relatively different successively displaced and substantially adjacent bandpass regions, means connecting said photocell device through said amplifying means to the input of said plurality of bandpass filters, a plurality of memory means individually coupled to each bandpass filter for storing a signal representing the value of the AC current passing through the bandpass filter, and means for successively scanning the memory means and transmitting the output values therefrom to an indicating or recording means for deriving information about the spectrum distribution of the signal derived from the photocell device and caused by variations in the light transmission ability of the material.

2. A device as claimed in claim 1 further comprising control means coupled to said recording means and to said scanning means for driving same in synchronism.

3. A device as claimed in claim 2 further comprising photoelectric sensing means positioned in the path of said material ahead of said photoelectric device and arranged to sense the rear edge of the material, and means for coupling the signal produced by said photoelectric sensing means to said control means, said control means including means responsive to said signal for initiating the scanning of the memory means.

4. A device as claimed in claim 2 further comprising means connecting the inputs of said bandpass filters together in parallel to the output of said amplifying means.

References Cited

UNITED STATES PATENTS

| 2,932,392 | 4/1960 | Burtner et al. | 250—219 X |
| 3,410,643 | 11/1968 | Jorgenson | 250—219 X |
| 3,349,905 | 10/1967 | Crawford. | |
| 3,317,736 | 5/1967 | Herrick et al. | 250—222 |

WALTER STOLWEIN, Primary Examiner

U.S. Cl. X.R.

356—200